United States Patent [19]
Sato

[11] Patent Number: 5,212,563
[45] Date of Patent: May 18, 1993

[54] CD-ROM AND CD-ROM REPRODUCING SYSTEM

[75] Inventor: Hironobu Sato, Tokyo, Japan

[73] Assignee: Japan Opto-Electronics Co., Ltd., Tokyo, Japan

[21] Appl. No.: 750,888

[22] Filed: Aug. 26, 1991

[30] Foreign Application Priority Data

Nov. 20, 1990 [JP] Japan .................................. 2-337860

[51] Int. Cl.$^5$ .............................................. H04N 5/91
[52] U.S. Cl. .................................. 358/341; 358/342; 358/343
[58] Field of Search ............... 358/310, 319, 335, 341, 358/342, 343, 347; 360/19.1, 20, 32; 369/48, 49, 50, 54

[56] References Cited

U.S. PATENT DOCUMENTS 4,858,024  8/1989  Kanamaru ........................... 358/310
4,953,153  8/1990  Suzuki ................................. 369/49

FOREIGN PATENT DOCUMENTS 152142  8/1985  European Pat. Off. .
2055080  3/1973  Fed. Rep. of Germany .

*Primary Examiner*—Tommy P. Chin
*Assistant Examiner*—Robert Chevalier
*Attorney, Agent, or Firm*—Edward D. Manzo

[57] ABSTRACT

A CD-ROM used for image formation by scanning a laser beam with a galvanometer in synchronism to the sound information. The CD-ROM has CD information recorded therein. The CD information comprises sound information and following galvanometer scan information. The CD information is preferably recorded at a sampling frequency of 22.5 KHz. A CD-ROM reproducing system for the CD-ROM is also disclosed. The system comprises a reproducing unit for reproducing the digital CD information from the CD-ROM, a selector unit for separating the sound information and the galvanometer scan D/A connecters for converting the digital soud and galvanometer scan information into the analog ones to supply them to a loudspeaker and a galvanometer, respectively.

2 Claims, 2 Drawing Sheets

CD-ROM AND CD-ROM REPRODUCING SYSTEM

BACKGROUND OF THE INVENTION

1. Field of the Invention

The present invention relates to a CD-ROM for displaying characters and drawing with a laser beam by synchronizing sound (or voice) and laser-beam-drawn image information to each other, and to a CD-ROM reproducing system suitable for use with the CD-ROM.

2. Detailed Description of Related Art

A laser display is well known in the art. According to the display, moving image or still image(s) is a laser beam(s) is projected on a screen such as a wall, a cloud, smoke, water, snow surface, etc., for displaying thereon a moving image(s) by scanning the laser beam in the directions of x-axis and/or y-axis using a galvanometer, and, at the same time, sound (or voice) information such as music is generated as effect sound in synchronism to the image formation.

Heretofore, however, data for scanning by the galvanometer are stored in a recording medium such as a floppy disk, a IC cards or a hard disk. Such recording medium is inadequate for direction taking long time in view of continuous reproduction and storage capacity. In addition, sound (or voice) information recording mediums are used separately from image information recording mediums such, for example, as record disks or magnetic tapes. Therefore, reproducing systems for the sound information and the image information are separately constructed each other, and it has been difficult to synchronize these systems to each other. Accordingly, it has been extremely difficult to obtain substantially perfect synchronization such that synchronization of image formation by the laser beam with sound information is not felt unnatural to the audience.

In order to solve the above problems inherent in the prior art, various researches and experiments has been repeatedly conducted by the inventor of this invention. As a result of this, following conduction is obtained. Considering the presently popular CD-DA (compact disk digital audio), it is possible to attain long continuous playing by using CD as recording medium for a laser display system. Also, it is possible to substantially perfectly synchronize the sound information and the formation of image by laser beam by simultaneously recording the sound information and the galvanometer scanning information in one and the same CD.

SUMMARY OF THE INVENTION

An object of the invention is to provide a CD-ROM, in which the galvanometer scanning information and the sound information are recorded, and also a reproducing system for such CD-ROM.

According to one aspect of the present invention, there is provided a CD-ROM used for image formation by scanning a laser beam with a galvanometer in synchronism to the sound information:

Wherein the CD-ROM has CD information recorded therein, the CD information comprising sound information and following galvanometer scan information.

Accordingly, basic information units each comprising a pair of the sound information and the galvanometer scanning information, are recorded sequentially in one and the same CD-ROM, so that it is possible to ensure a sufficient amount of recording suited for a long-time direction or long playing program of laser display.

In addition, the sound information and the galvanometer scanning signal are recorded in and reproduced from one and the same CD-ROM by using an identical and common sampling frequency and a common sync signal(s). Thus, there is no possibility of deviation from synchronization between the generation of the sound and the formation of the image by matching between the sound gerneration and the image formation. It is thus possible to obtain the greatly enhanced effects as compared with the prior art.

In carrying out the invention, the sampling frequency is set to 22.05 KHz (i.e., 22.050 times a second), which is different from the conventional sampling frequency of 44.1 KHz. The setting of the frequency to one-half of the conventional one as mentioned above, invites the reduction of information recording density, resulting in the inevitable deterioration of sound quality. Nevertheless, it is possible to maintain the sound quality comparable to the quality of reproduced sound from conventional LP record disks.

Further, in carrying out the invention it may be preferable that information is the left and right sound information of a 2-channel stereo system and that the galvanometer scanning information is x- and y-axis scanning information for the two-dimentional image display. In this case, the left and right sound information as well as, x- and y-axis scanning information are also recorded at a common sampling frequency of 22.05 KHz, and thus they can be read out at this frequency.

Further, according to another aspect of the present invention, there is provided a CD-ROM reproducing system comprising:

a reproducing unit for performing the digital signal processing of the CD information read out from a CD-ROM for reproduction, a selector unit for separating digital voice information and digital galvanometer scanning information from digital CD information obtained from the reproducing unit, a first D/A converter for converting the digital sound information from the selector unit to analog sound information to be supplied to a loudspeaker, and a second D/A converter for converting digital galvanometer scanning information from the selector unit to analog galvanometer scanning information supplied to the galvanometer.

In this reproducing system, the information read out from the CD-ROM is divided into the sound information and the galvanometer scanning information by the selector unit, and the former information can be supplied to the sound reproducing system, while the latter to the galvanometer accurately. In addition, the sound information and galvanometer scanning information can be synchronized with a common sync sign signal, the deviation from synchronization presenting unnatural matching between the sound generation and the image depiction, is prevent from occurring during reproduction.

BRIEF DESCRIPTION OF THE DRAWINGS

The foregoing and offer objects, features and advantages of the present invention will be better understood from the following description taken in connection with the accompanying drawing, in which.

DESCRIPTION OF THE PREFERRED EMBODIMENT

Examples according to the present invention will now be described while referring to the accompanying drawings. In the following, the description concerning information such as usually used to a CD-ROM and a CD-ROM reproducing system will be omitted.

Firstly, the CD-ROM of the present invention will be hereinafter described.

Figure 1:
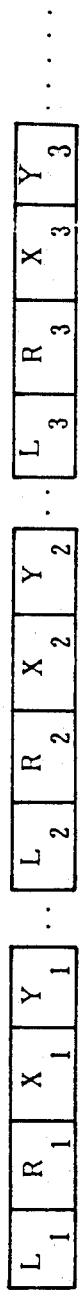
FIG. 1 is a view for explaining the status of recording of the sound information and image formational information in a CD-ROM according to the invention.

According to the invention, the sound (or voice) information (or sound (or voice) data) of two channels and the scanning information of two channels are repeatedly recorded as the CD information of a total of four channels in the CD-ROM. The sound information includes left (L) and right (R) channels, and the scanning information includes the x- and y-axis scan information (or x- and y-axis scan data). Thus, the sound data and scan data are recorded in the order of data L, R, X and Y in the CD-ROM, the state of recording being shown in FIG. 1. As is shown in FIG. 1, sequential 4-channel information sets ($L_1$, $R_1$, $X_1$, $Y_1$), ($L_2$, $R_2$, $X_2$, $Y_2$), ($L_3$, $R_3$, $X_3$, $Y_3$) and so on, are recorded in the above mentioned order in a CD track. The 4-channel information set serves as a minimum unit on reproducing or reading the sound information and the image formation.

According to the invention, the sampling frequency for recording and reproducing the sound data L and R and the scan data X and Y is set to 22.01 KHz (corresponding to recording and reproduction of 22,050 times per second). The sound (or voice) data L and R are recorded each with 16 bits, i.e., with a total of 32 bits, and the scan data X and Y are recorded each as 12 bits i.e., with a total of 24 bits. Following the sound (or voice) data (32 bits) and the scan data (24 bits), a subcode necessary for reading (i.e., reproduction) of the CD information is recorded as 8 bits. Thus, the information of the minimum unit is recorded with 64 bits in the CD track.

In a preferred embodiment of the invention, the most significant bit of the sound (or voice) data L and R are made to a logic state "1", respectively, while the most significant bit of the scan data X and Y made to a logic state "0", respectively. This permits the reproduction of each read-out datum to be effected accurately as will be described later.

As described above, the CD-ROM of the present invention has characteristic that not only the sound (or voice) information but also the galvanometer scan information is recorded as the CD information and that the sampling frequencies of the sound (or voice) information and the galvanometer scan information are set to 22.01 KHz. The galvanometer scan information is recorded as the image forming information subsequently to such the sound (or voice) imformaiton. As for the rest, since it is the same as conventional CD-ROM, detailed description in this respect is not given.

Now, a recording way of galvanometer scan information serving as image formational information in the CD-ROM will hereinafter be described briefly.

With a use of the galvanometer scanning, a figure(s) and /or a characteristic(s) is drawn in one stroke by a laser beam. First of all, an original image to be scanned is processed by a digitizer to make digitized data, and then the digitized data are input to a computer and stored therein. Animation is prepared from the data of several original images already stored in the computer. The digital data which are rendered into the animation information by the computer are divided into the digital scan data of x- and y-axis scan components. These digital scan data and music digital data (i.e., sound data L and R) are re-arranged to an order of the sound data L, the sound data R, the x-scan data and the y-axis scan data and then temporarily stored as binary data in a floppy disk or a magnetic tape. The data recorded in the floppy disk or the magnetic tape are read into a CD-ROM writer and recorded as the digital data in the CD-ROM. Each of the above-mentioned themselves can be done in usual ways.

Figure 2:
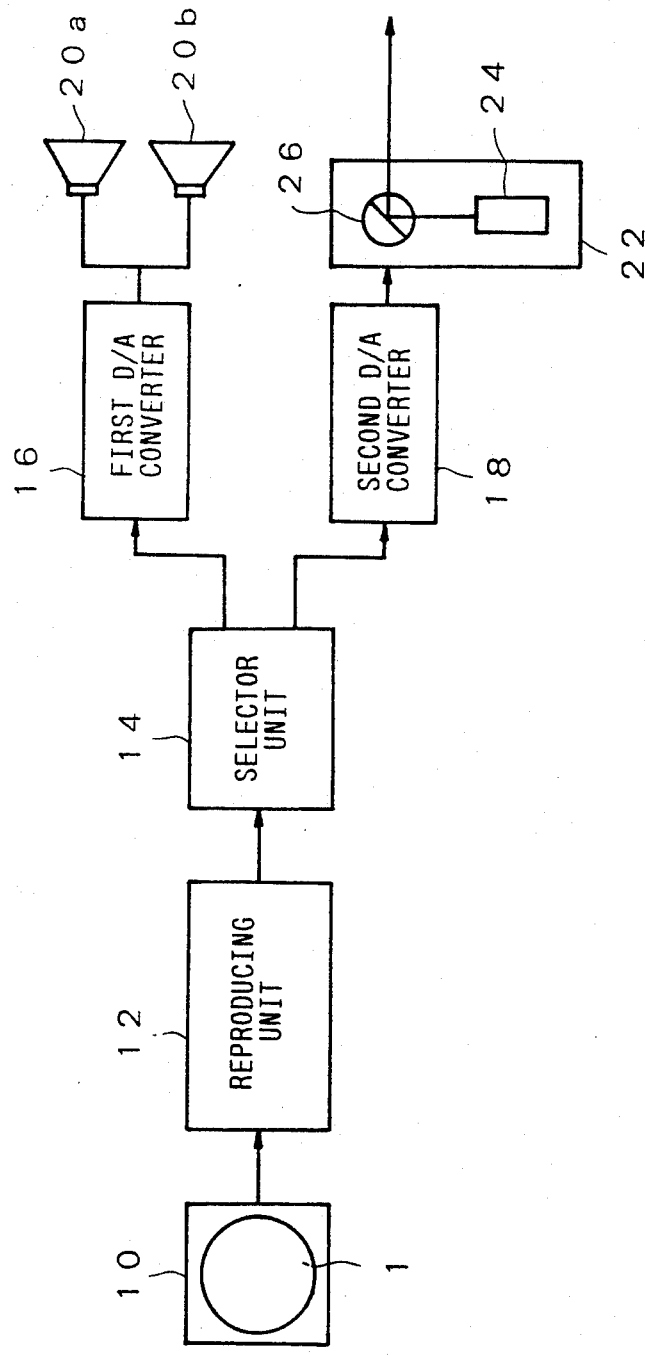
FIG. 2 is a block diagram showing are embodiment of a CD-ROM reproducing system according to the invention.

FIG. 2 is as schematic illustration of a reproducing system for reproducing the CD-ROM according to the present invention. Referring to FIG. 2, the CD information is read out from a CD-ROM disk 1 by a CD-ROM player 10 with its optical pick-up. The read-out CD information is supplied to a reproducing unit 12. In the reproducing unit 12, the read-out CD information is subject to amplification, the error collection, the low frequency filtering operation, and other necessary digital signal processings. From the reproducing unit 12, the digital sound information and the digital galvanometer scan information are supplied to a selector unit 14 for separating therebetween. Reference numerals 16 and 18 show first and second D/A converters, respectively. The first D/A converter receives the information as a digital input from the selector unit 14 and converts it an analog output to supply the output to loudspeakers 20a and 20b for reproducing sound of two channels, i.e., left and right channels. The second D/A converter 18 receives the galvanometer scan information as a digital input from the selector unit 14 and converts it an analog output to supply the output to a laser scanning projector 22. The laser scanning projector 22 includes a laser 24 (which uses a single laser tube in cases of a single color and a plurality of laser tubes in case of two or more colors) and a galvanometer 26 for scanning a laser beam from the laser in the directions of x- and y-axis. In this embodiment, the galvanometer 26 receives at its x-axis scanner mirror the input laser beam to produce an x-axis scan laser beam. The x-axis scan laser beam is supplied to a y-axis scanner mirror for y-axis scanning, whereby a character or a figure as X, Y two-dimensional image is formed in one stroke of laser beam. In this embodiment, therefore, the reflection angle of the x-axis scanner mirrors controlled by the x-axis scan information, and the reflection angler of the y-axis scanner mirror is controlled by the y-axis scan information.

The above described constructions and operations of CD-ROM disk 1, the CD-ROM player 10, the reproducing unit 12, the first and the second D/A converters 16 and 18, the loudspeakers 22a and 22b and the laser scanning projector 22 constituting the CD-ROM reproducing system are well known in the art, and they are described any further. As is explained hereinbefore, the invention is different from that of the prior art laser display system in the following points. In the system of the present invention, the sound information and the galvanometer scan information are recorded in a CD- ROM, the sampling frequency for recording and reproducing the CD information is sets to 22.05 KHz and not only the synchronization of the whole system according to the invention but also the synchronization between the sound (or voice) information and the galvanometer scan information for driving the galvanometer incorporated in the laser scanning projector is effected with one and the same sync signal to ensure synchronization of both of information.

The selector unit 14 constitutes an interface, to which are supplied the error-corrected sound information and the error-corrected galvanometer scan information. The selector 14 collates the input information (or data) with preliminarily recorded information to check whether there is no information order change on the data bus, and judges from the above check whether the information is supplied in the order of the left sound information (or L-sound data), the right sound information (or R-sound data), x-axis scan information (X-scan data) and y-axis scan information ( or Y-scan data) If it is determined that the order is right, the selector unit 14 supplies the L- and R- sound data to the first D/A converter 16 and X- and Y-scan data to the second D/A converter 18, respectively.

The above check in selector unit 14 is done as follows.

Figure 3:
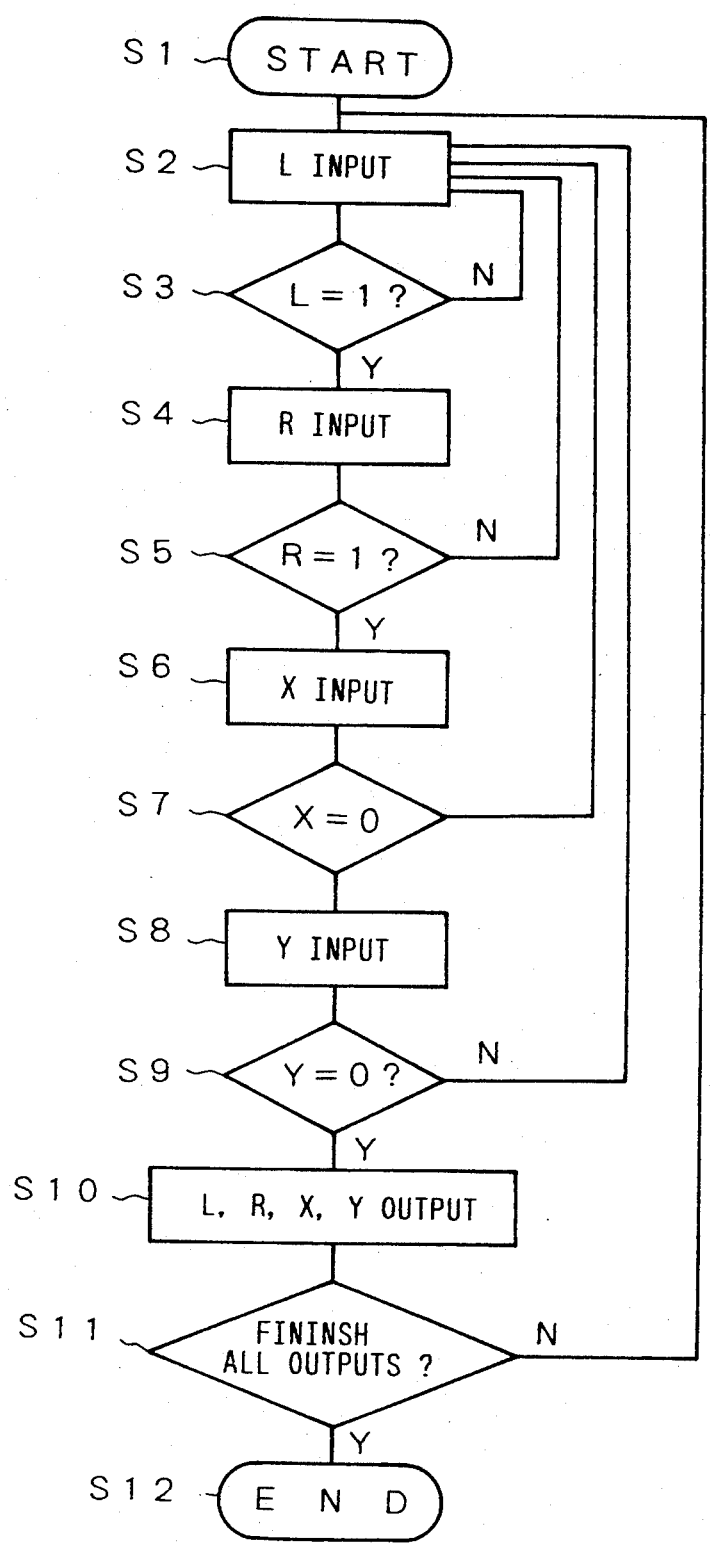
FIG. 3 is a flow chart for explaining the operation of one example of a selector unit used in the CD-ROM reproducing system according to the invention.

FIG. 3 is a flow chart for the check. In the Figure, steps are designated by a symbol S. As noted earlier, the L-sound data, the R-sound data, the X-scan data and the Y-scan data are individually constituted by 16-bit data. At the time of input to CD-ROM, logic state "1" is input as the most significant bit of the L- and R-sound data, and logic state "0" as the most significant bit of the L- and R-sound data. After start of the check routine in the reproduction (step S1), the L-sound data is first input to the selector unit 14 (step S2). Then, the selector unit 14 checks whether the most significant bit takes logic state "1" or "0" (step S3). If the bit is "1", the routine goes to a check for the next L-sound data. If the bit is "0", the routine goes back to the step S2 for checking the sound data. When the next R-sound data is input to the selector unit 14 (step S4), a check is executed therein as to whether the most significant bit of R-sound data is "1" or "0" (step S5). If the bit is "1", a check of next scan data is executed If the bit is "0", the routine goes back to the step S2 of checking the first L-sound data.

When the x-scan data is subsequently input to the selector unit 14 (step S6), a check is done as to whether the most significant bit of this data is "0" or "1". If the bit is "0", the routine goes to a check for the next Y-scan data. If the bit is "1", the routine goes back to the step S2 for a check of the first L-sound data. when the next Y-scan data is input (step S8), a check is done therein as to whether the most significant bit of the data is "0" or "1" (step S9). If the bit is "0" , the routine goes back to the next step S10. If the bit is not "0", the routine goes back to step S2 for check of the first L-sound data.

In this way, selector unit 14 detects the mosts significant bit "1" of the L-sound data, that "1" of the R-sound data, the most significant bit "0" of the X-scan data, and that "0" of the Y-scan data, respectively, to determine that all the L-, R-, X- and Y- data are normal and outputs these data as a four-bit data block "1100". When the output data has the data block "1100", the selector unit 14 supplies the binary data "11" on the first two bits of the data "1100" to the first D/A converter 16 and the subsequent binary data "00" on the last two bits of the data "1100" to the second D/A converter 18. The above check is executed sequentially and cyclically for individual sets of the data L-and R- sound data and X- and Y- scan data.

The data L-and R-sound data and X- and Y- scan data supplied from the selector unit 14 to the first and second D/A converters 16 and 18, respectively, are synchronized, and L-sound data is supplied to the loudspeaker 20a, the R-sound data to the loudspeaker 20a, the R-sound data to the loudspeaker 20b, and the X- and Y-scan data to the x- and y-axis scan drive units of the galvanometer 26 of the laser scan projector 22 respectively. Thus, the image formation by the laser beam can be substanitally completely synchronized with the sound information.

As is shown in the foregoing, in the CD-ROM and CD-ROM reproducing system according to the invention, the sound information and the image formational information which are necessary for the laser display, are recorded as a pair in one and the same recording medium of CD-ROM. Thus, it is possible to record a greater quantity of information in the CD-ROM and perform continuous direction for longer time as compared with the case of the prior art.

In addition, since the sound information and the image formational information are recorded on a common track(s) of the CD-ROM and read out under control of one and the same sync signal for laser display, there is no possibility of deviation from synchronization between the sound and the image formation, and a far superior effect of laser display direction can be obtained as compared with the case of the prior art.

Further, with the CD-ROM reproducing system according to the invention, the sound information and the image formational information are recorded in the CD-ROM as one and the same recording medium, it is possible to compactly construct the integrated system and make the scanning easy.

What is claimed is:
1. A reproducing system for a CD-ROM comprising:
 a reproducing unit for digital signal processing of CD information read out from the CD-ROM for reproduction,
 the CD-ROM having stored thereon successive sets of data, each set consisting essentially of digital galvanometer scan information and sound data for sound to be generated when an image is generated at a position corresponding to the digital galvanometer scan information, wherein the successive sets of data stored on the CD-ROM do not include further video information,
 a selector unit for separating digital sound information and digital galvanometer scan information from digital CD information obtained from said reproducing unit,
 a first D/A converter for converting the digital sound information from the selector unit into analog sound information to supply the latter information to a loudspeaker, and
 a second D/A converter for converting the digital galvanometer scan information from the selector unit into analog galvanometer scan information to supply the latter information to a galvanometer.
2. A method of generating an image and producing sound synchronously with the image, comprising the steps of:
 successively reading sets of data from a CD-ROM, each set of data consisting essentially of laser scan position data together with sound data for sound to be generated when a laser beam is directed to a position corresponding to the laser scan position data, said successively reading step not including reading video information from the CD-ROM, the reading step providing the laser scan data and sound data for each set synchronously;

successively separating the laser scan position data from the sound data after it has been read;

controlling a laser scanning apparatus successively in accordance with the scan position data; and generating a succession of sounds from the sound data.

* * * * *